United States Patent
Saito et al.

(10) Patent No.: US 12,485,836 B2
(45) Date of Patent: Dec. 2, 2025

(54) INSTALLATION STRUCTURE FOR HIGH-VOLTAGE ELECTRICAL DEVICE INSTALLED ON FRONT SECTION OF VEHICLE

(71) Applicants: NISSAN MOTOR CO., LTD., Yokohama (JP); RENAULT s.a.s., Boulogne-Billancourt (FR)

(72) Inventors: Kousuke Saito, Kanagawa (JP); Masayuki Mochimatsu, Kanagawa (JP)

(73) Assignees: NISSAN MOTOR CO., LTD., Yokohama (JP); RENAULT S.A.S., Boulogne-Billancourt (FR)

( * ) Notice: Subject to any disclaimer, the term of this patent is extended or adjusted under 35 U.S.C. 154(b) by 7 days.

(21) Appl. No.: 18/563,319

(22) PCT Filed: May 25, 2021

(86) PCT No.: PCT/IB2021/000359
§ 371 (c)(1),
(2) Date: Nov. 21, 2023

(87) PCT Pub. No.: WO2022/248899
PCT Pub. Date: Dec. 1, 2022

(65) Prior Publication Data
US 2024/0217457 A1    Jul. 4, 2024

(51) Int. Cl.
*B60R 16/02* (2006.01)
*B60L 53/22* (2019.01)
*B62D 21/03* (2006.01)
*H05K 5/02* (2006.01)

(52) U.S. Cl.
CPC .............. *B60R 16/02* (2013.01); *B60L 53/22* (2019.02); *B62D 21/03* (2013.01); *H05K 5/0217* (2013.01)

(58) Field of Classification Search
CPC .......... B60R 16/02; B60L 53/22; B62D 21/03
See application file for complete search history.

(56) References Cited

U.S. PATENT DOCUMENTS 3,651,883 A * 3/1972 Aldag ................ H01M 50/262
180/68.5
4,129,194 A * 12/1978 Hammond .......... H01M 50/204
180/68.5
5,460,234 A * 10/1995 Matsuura ............ H01M 50/242
180/68.5

(Continued)

FOREIGN PATENT DOCUMENTS

CN    102463881 A    5/2012
CN    110171477 A    8/2019

(Continued)

*Primary Examiner* — Paul N Dickson
(74) *Attorney, Agent, or Firm* — Foley & Lardner LLP (57) ABSTRACT

In an installation structure of a high-voltage electrical device installed on a front section of a vehicle, the high-voltage electrical device is attached to a cross member of a vehicle body by an L-shaped front bracket. The cross member extends in a lateral direction of the vehicle in front of the high-voltage electrical device. A boss protrudes forward from a housing of the high-voltage electrical device. A lower vertical portion of the front bracket is fastened to the boss by a bolt and its upper horizontal portion is fixed to the cross member. A vulnerable portion is formed at a root of the boss.

5 Claims, 6 Drawing Sheets

(56) References Cited

U.S. PATENT DOCUMENTS

| | | | | |
|---|---|---|---|---|
| 5,484,667 | A * | 1/1996 | Sahli | H01M 50/291 |
| | | | | 180/68.5 |
| 5,542,489 | A * | 8/1996 | Allison | B60R 16/04 |
| | | | | 219/202 |
| 6,230,833 | B1 * | 5/2001 | Setsuda | B60R 16/04 |
| | | | | 180/68.5 |
| 7,051,825 | B2 * | 5/2006 | Masui | B60L 50/16 |
| | | | | 280/783 |
| 7,594,559 | B2 * | 9/2009 | Kitoh | B62D 21/155 |
| | | | | 180/274 |
| 7,926,602 | B2 * | 4/2011 | Takasaki | H01M 50/209 |
| | | | | 180/68.5 |
| 8,859,126 | B2 * | 10/2014 | Yamada | H01M 10/66 |
| | | | | 429/153 |
| 9,931,937 | B2 * | 4/2018 | Murase | H05K 7/20918 |
| 2004/0235315 | A1 * | 11/2004 | Masui | B60L 50/66 |
| | | | | 439/34 |
| 2012/0121959 | A1 | 5/2012 | Yamada | |
| 2014/0319880 | A1 * | 10/2014 | Shigihara | B62D 21/155 |
| | | | | 296/193.09 |
| 2018/0056901 | A1 | 3/2018 | Ando et al. | |
| 2020/0070893 | A1 * | 3/2020 | Atkin | B62D 25/145 |
| 2022/0363119 | A1 * | 11/2022 | Nakagawa | B60K 1/04 |

FOREIGN PATENT DOCUMENTS

| | | |
|---|---|---|
| CN | 211791018 U | 10/2020 |
| JP | H06-031327 U | 4/1994 |
| JP | 2000-350331 A | 12/2000 |
| JP | 5716481 B2 | 5/2015 |
| JP | 2017-081503 A | 5/2017 |
| JP | 2018-030557 A | 3/2018 |

\* cited by examiner

INSTALLATION STRUCTURE FOR HIGH-VOLTAGE ELECTRICAL DEVICE INSTALLED ON FRONT SECTION OF VEHICLE

TECHNICAL FIELD

The present invention relates to an installation structure for a high-voltage electrical device installed on a front section of a vehicle.

BACKGROUND ART

A Patent Literature 1 listed below discloses an installation structure for a high-voltage electrical device on a vehicle. A high-voltage voltage electrical device is a device that handles a high voltage (60V or higher), and a special electrical system with a dedicated grounding wire, rather than body grounding, is used for the high-voltage electrical device. In the installation structure, a bracket integrally and horizontally protruding from a side wall of a housing of the high-voltage electrical device is fixed to a vehicle body by a bolt. In the event of a vehicle frontal collision, a vulnerable portion in the bracket is broken, and thereby a main unit of the high-voltage electrical device (electric components within its housing) is protected without being exposed.

CITATION LIST

Patent Literature

Patent Literature 1: Japanese Granted Patent Publication No. 5716481

SUMMARY OF INVENTION

Problem to be Solved

In the installation structure disclosed in the Patent Literature 1, an impact load at the time of the frontal collision effectively acts to break the bracket, because the high-voltage electrical device and the fixing position to the vehicle are located at the same height level. However, if the height level of the high-voltage electrical device and the height level of the fixing position to the vehicle are different, a bending moment is generated in the bracket, and a tensile load acts on the housing of the high-voltage electrical device due to the moment. As a result, a main body of the housing may be torn off, and thereby the electrical components within the housing may be exposed. In other words, in such a case, there is a possibility that the high-voltage electrical device will not be reliably protected.

Solution to Problem

In an installation structure for a high-voltage electrical device installed on a front section of a vehicle according to an aspect of the present invention, the high-voltage electrical device is attached to a cross member of a vehicle body by an L-shaped front bracket. The cross member extends in a lateral direction of the vehicle in front of the high-voltage electrical device. A boss, at the center of which a bolt hole is formed, protrudes forward from a front panel of a housing of the high-voltage electrical device. A lower vertical portion of the front bracket is fastened to the boss by a bolt and its upper horizontal portion is fixed to the cross member. A vulnerable portion is formed at a root of the boss.

Advantageous Effects

According to the aspect, the high-voltage electrical device installed on the front section of the vehicle can be protected reliably in the event of a vehicle frontal collision.

DESCRIPTION OF EMBODIMENTS

Hereinafter, an installation structure according to an embodiment will be described with reference to FIG. 1 to FIG. 8. A high-voltage electrical device 1 is installed at a front section of a vehicle by this installation structure. Note that a forward direction of the vehicle is indicated by an arrow FR in FIG. 2 and FIG. 8.

Figure 1:
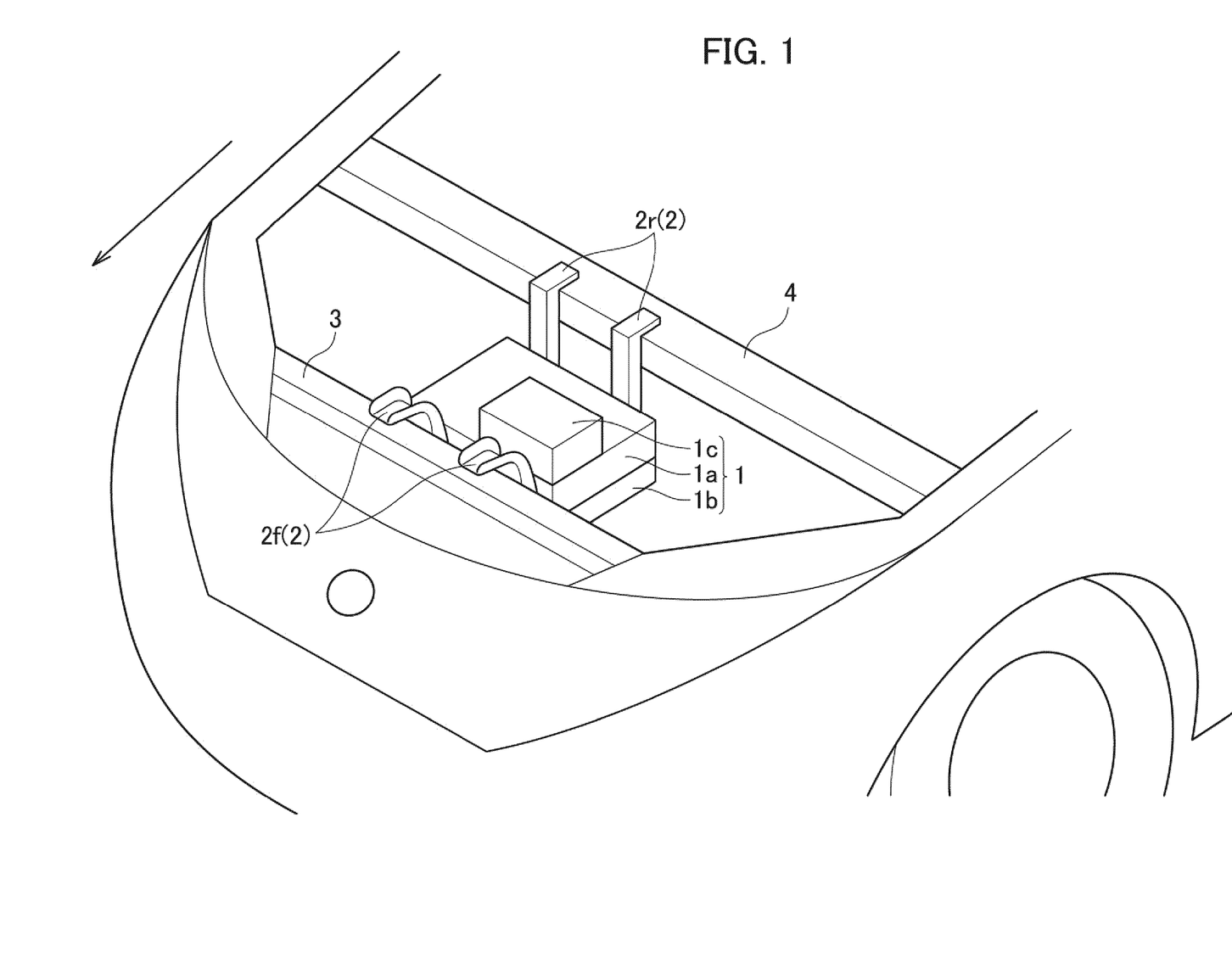
FIG. 1 is a schematic perspective view showing an installation structure according to an embodiment.
Figure 2:
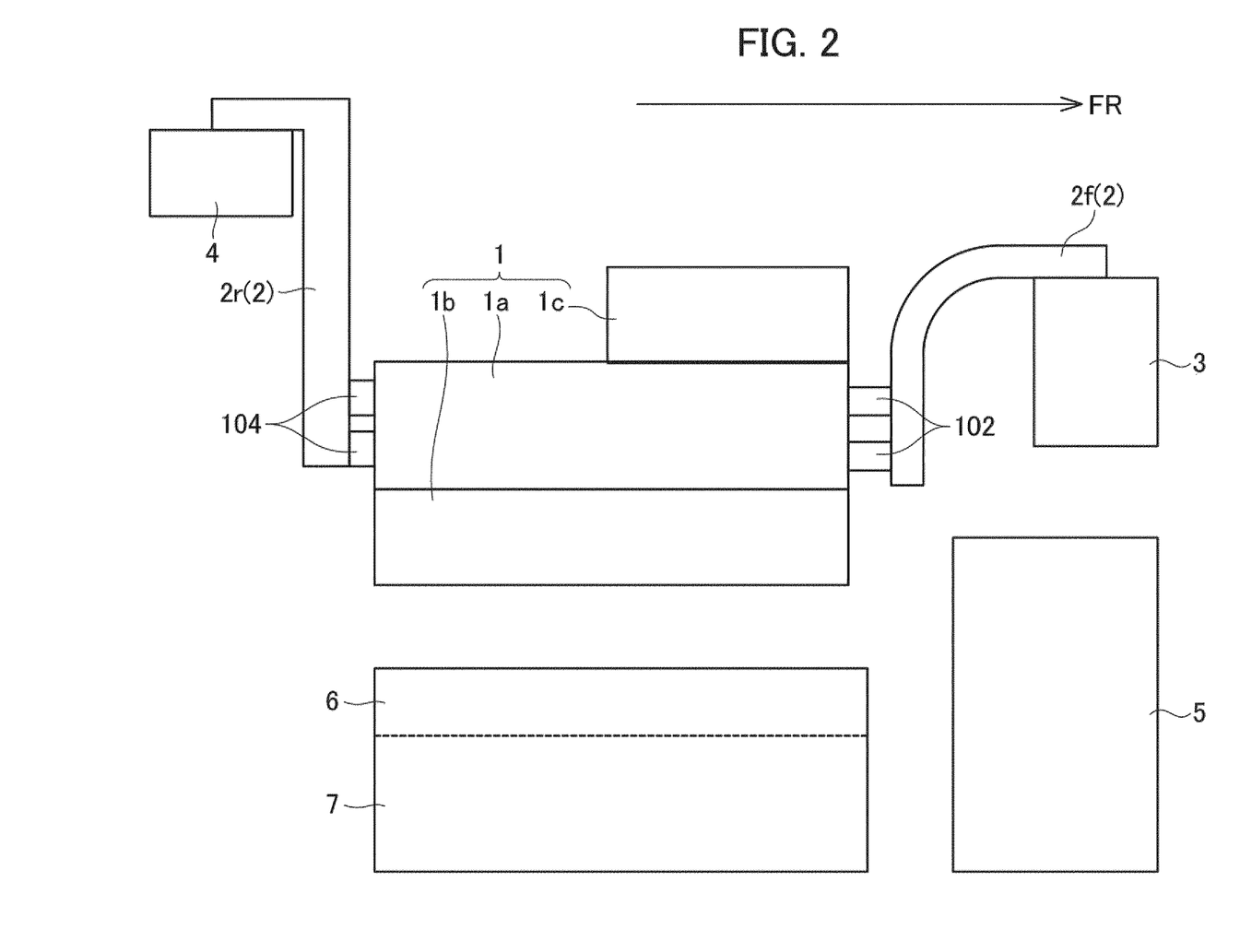
FIG. 2 is a schematic side view showing the installation structure.

As shown in FIG. 1 and FIG. 2, the high-voltage electrical device 1 according to the installation structure in the present embodiment is installed in a motor room at the front section of the vehicle. A high voltage battery (not shown) is installed on the vehicle, and the vehicle is a battery electric vehicle (BEV) that runs on electricity stored in the high voltage battery. The high-voltage electrical device 1 is an OBC (On-Board Charger) unit that charges the high voltage battery. The high-voltage electrical device 1 is one of high-voltage electrical devices that handle high voltages (60V or higher). Hereinafter, the high-voltage electrical device 1 according to the installation structure in the present embodiment is referred to the OBC unit 1.

The OBC unit 1 includes an OBC 1*a*, a DCDC converter 1*b*, and a junction box 1*c*. Each of these is also a high-voltage electrical device. The OBC 1*a* has a housing 100 (see FIG. 3), and the DCDC converter 1*b* and the junction box 1*c* are fixed to the housing 100. The DCDC converter 1*b* is fixed to a lower portion of the housing 100, and the junction box 1*c* is fixed to an upper portion of the housing 100.

An inverter 6 and a high voltage electric motor 7 are installed beneath the OBC unit 1. Each of these is also a high-voltage electrical device. The inverter 6 and the high voltage electric motor 7 are integrated with being housed in a single housing. The inverter 6 and the high voltage electric motor 7 are attached to a subframe, and the subframe is attached to side members (not shown) of the vehicle body.

The OBC unit 1 is attached to cross members 3 and 4 that construct a vehicle body such that it is suspended by L-shaped brackets 2 (2*f* and 2*r*). More specifically, the housing 100 of the OBC 1a is attached to the vehicle body by the L-shaped brackets 2 (2f and 2r), and thereby the DCDC converter 1b and the junction box 1c are also attached to the car body via the OBC 1a.

In front of the OBC unit 1, the cross member 3 extends in a lateral direction of the vehicle. The cross member 3 is specifically a radiator core upper support that supports an upper portion of a radiator core 5. On the other hand, the cross member 4 extends in the lateral direction behind the OBC unit 1. The OBC unit 1, i.e., the housing 100 of the OBC 1a, is installed such that it is suspended by a pair of the front brackets 2f and a pair of the rear brackets 2r from the cross members 3 and 4.

Figure 3:
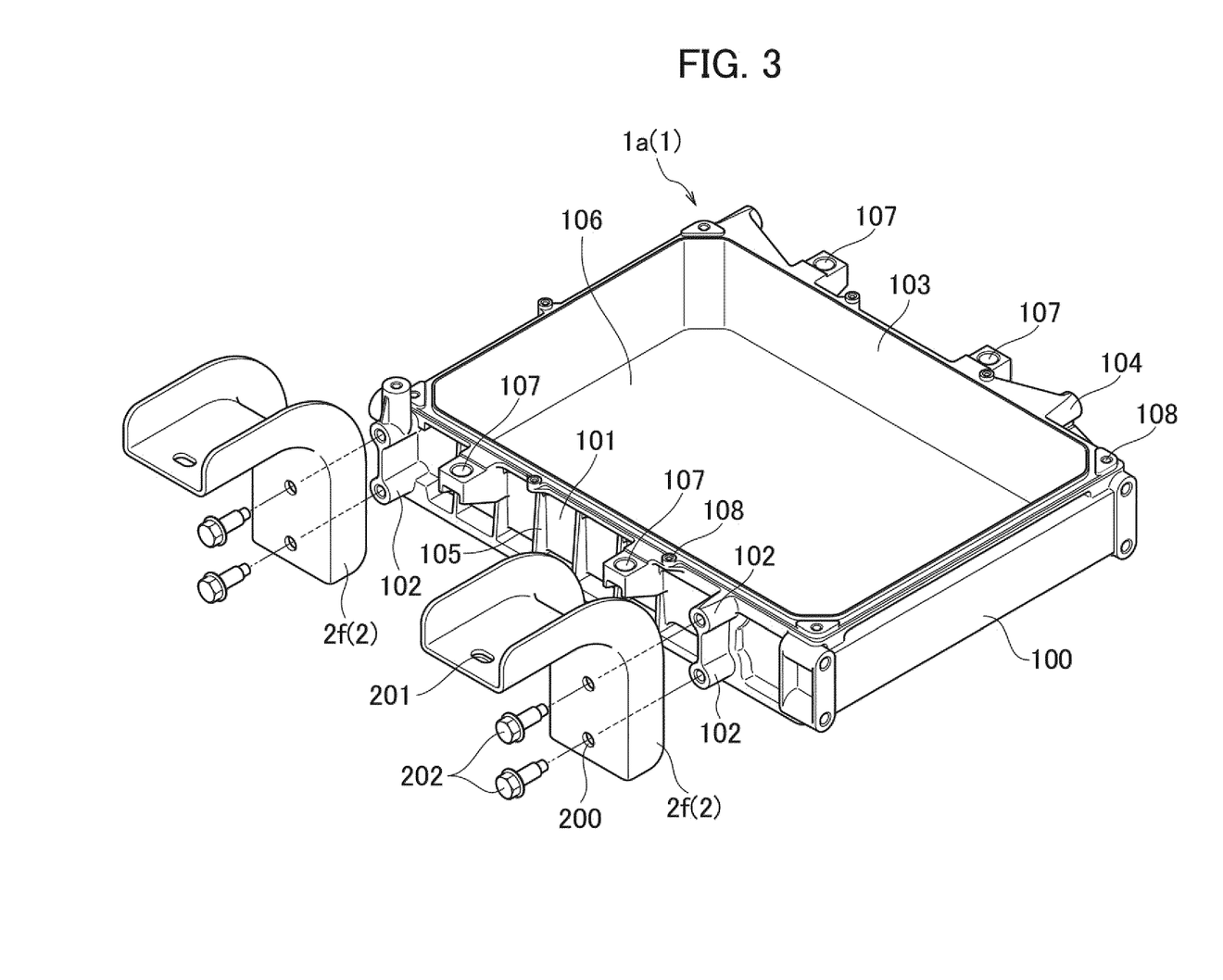
FIG. 3 is a perspective view showing a housing of a high-voltage electrical device (an OBC unit) and brackets for fixing the housing to a vehicle body in the structure.

As shown in FIG. 3, two pairs of cylindrical bosses 102 are protruded forward from a front plate 101 of the housing 100. A bolt hole 102a (see FIG. 4) is formed in the center of each of the bosses 102. In addition, a reinforcing rib 102b is also formed between each pair of the bosses 102. The housing 100 is made of aluminum, and its rear plate 103, its side plates and its bottom plate 106 and so on are also integrally formed in addition to the front plate 101 and the bosses 102. The one pair of the bosses 102 is provided on a right portion of the housing 100 so as to be lined up vertically. The other pair of the bosses 102 is provided on a left portion of the housing 100 so as to be lined up vertically.

Note that a lid of the housing 100 is not shown in FIG. 3, but the lid is attached by using screw holes 108. A pair of brackets 107 protrudes forward from the top edge of the front plate 101, and another pair of brackets 107 protrudes rearward from the top edge of the rear plate 103. The above-mentioned junction box 1c is secured to these brackets 107. Plural ribs 105 are also formed on the front face of the front plate 101 at intervals. The ribs 105 and the brackets 107 are also integrally formed with the housing 100.

A lower vertical portion of the front bracket 2f is fastened to each pair of the above-mentioned bosses 102 by bolts 202. Both side edges of the front bracket 2f are flanged to improve rigidity and strength. The front bracket 2f is an angle member made of steel. A pair of bolt insertion holes 200 for inserting the bolts 202 are formed on the lower vertical portion of the front bracket 2f. The bolts 202 are fastened to the above-mentioned bolt holes 102a. On the other hand, bolt insertion holes 201 are also formed on an upper horizontal portion of the front bracket 2f. The upper horizontal portion of the front bracket 2f is secured to the cross member 3 by the bolt insertion holes 201.

A vulnerable portion is formed at a root of the lower boss 102 of the two bosses 102 in each pair. The vulnerable portion breaks when the front bracket 2f moves backward relative to the housing 100 during a frontal collision of the vehicle, and thereby a main body of the housing 100 can be prevented from being damaged. This prevents the electrical components within the housing 100 from being exposed and reliably protects the OBC 1a, i.e., the OBC unit 1. The vulnerable portion in the present embodiment is specifically constructed by following structures [1] and [2].

Figure 4:
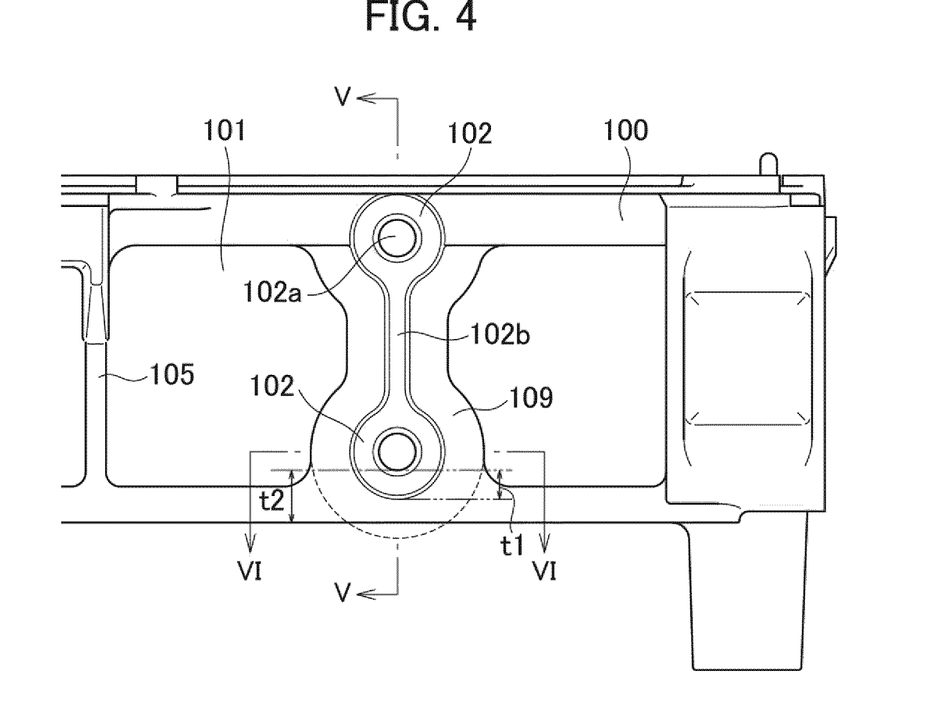
FIG. 4 is a front view showing bosses of the housing to which the bracket is attached.
Figure 5:
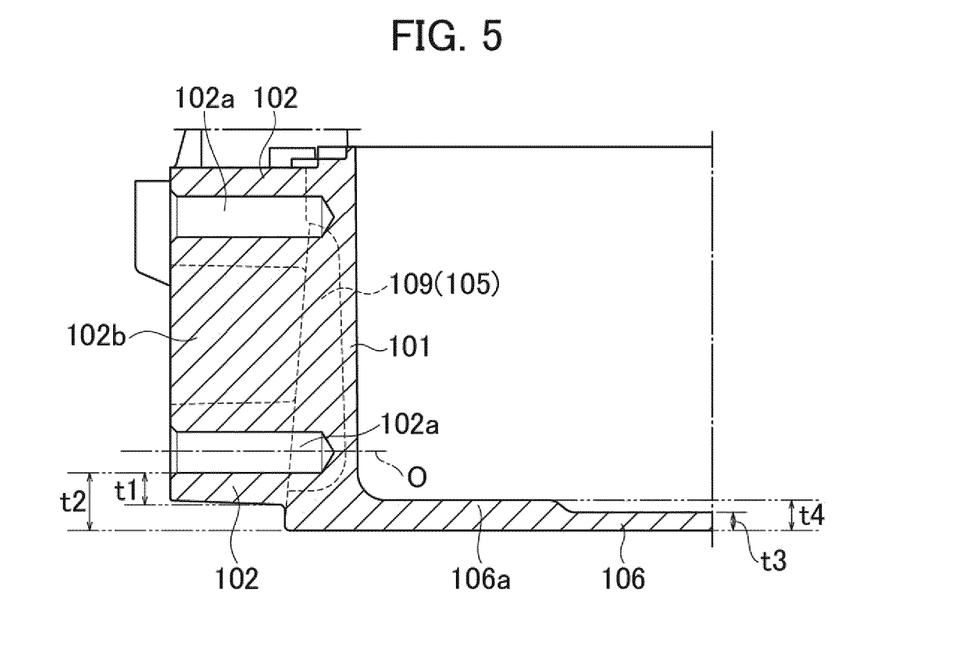
FIG. 5 is a cross-sectional view taken along a line V-V in FIG. 4.
Figure 6:
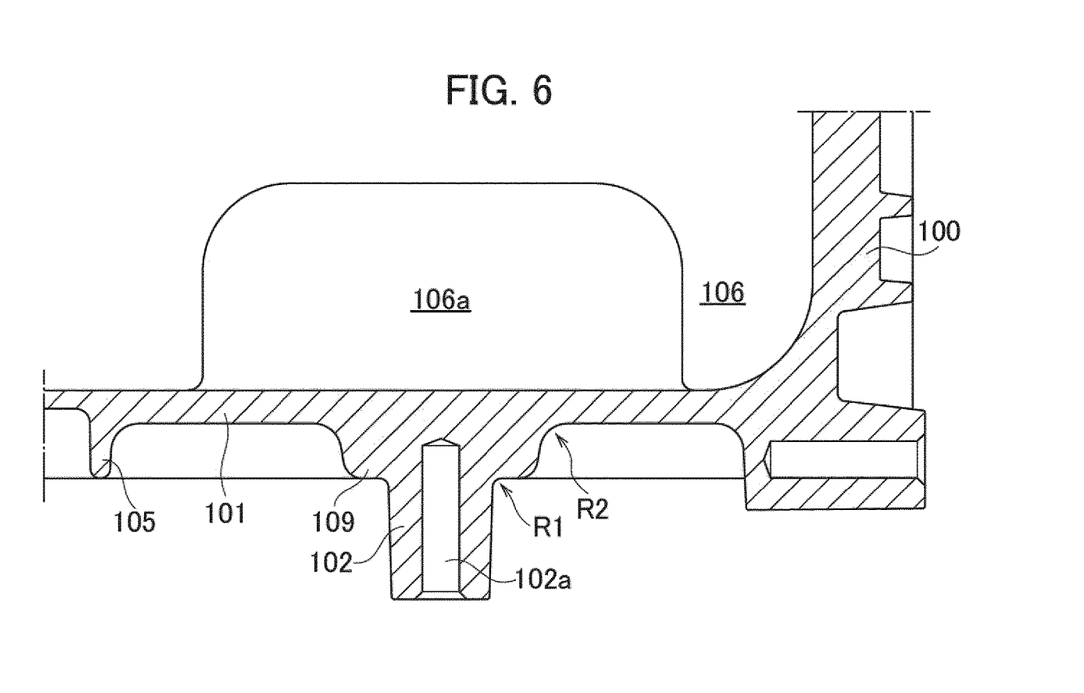
FIG. 6 is a cross-sectional view taken along a line VI-VI in FIG. 4.

[1] As shown in FIG. 4 to FIG. 6, the lower boss 102 protrudes forward from a pedestal 109 integrally formed on the front plate 101. In addition, a thickness t1 of the root (vulnerable portion) of the boss 102 in a direction perpendicular to an axial line O of the bolt hole 102a is made smaller than a thickness t2 of the pedestal 109 in that direction. Since a thickness of the pedestal 109 is not uniform over the entire circumference of the boss 102, the comparison here is done with respect to the thickness t2, which is weak in terms of strength and thinnest, at its lowermost portion. In the present embodiment, the upper boss 102 also protrudes forward from the pedestal 109.

In the present embodiment, a front-to-back width of the upper portion of the pedestal 109 is made larger than a front-to-back width of the lower portion of the pedestal 109 as shown in FIG. 5. That is, the surface of the pedestal 109 is sloped. Therefore, when a tensile force acts on the lower boss 102 to pull out the bolt 202, the lower portion of the pedestal 109 is more able to resist the tensile force than the upper portion of the pedestal 109. The tensile force acts during the frontal collision of the vehicle, and this will be explained later. Note that, also with respect to the rib 105, a front-to-rear width of its upper portion is also made larger than a front-to-rear width of its lower portion.

Since the thickness t1 of the boss 102 is smaller than the thickness t2 of the pedestal 109, the vulnerable portion at the root of the boss 102 breaks when the above-mentioned tensile force acts on the boss 102 and thereby the main body of the housing 100, including the front plate 101 on which the pedestal 109 is formed, can be prevented from being damaged. This prevents the interior of the housing 100 from being exposed.

[2] Furthermore, a rising curvature radius R1 of the root of the boss 102 as the vulnerable portion from the pedestal 109 is made smaller than a rising curvature radius R2 of the pedestal 109 from the front plate 101 as shown in FIG. 6. Therefore, more stress is concentrated on the vulnerable portion at the root of the boss 102 when the above-mentioned tensile force acts on the boss 102. Thus, the vulnerable portion at the root of the boss 102 is more prone to break.

Note that, in the present embodiment, the installation structure on the front side of the above-mentioned OBC unit 1 is symmetrically constructed also on the rear side of the OBC unit 1. That is, two pairs of cylindrical bosses 104 protrude rearward integrally from the rear plate 103 of the housing 100. The one pair of the bosses 104 is provided on the right portion of the housing 100 so as to be lined up vertically, and the other pair of the bosses 104 is provided on the left portion of the housing 100 so as to be lined up vertically. Then, a lower vertical portion of a rear bracket 2r is fastened to each pair of the bosses 104 by bolts, and an upper horizontal portion of the rear bracket 2r is fixed to the cross member 4. The lower boss 104 in each pair of the bosses 104 has the above-mentioned vulnerable portion.

The action of the tensile force on the lower boss 102 during a frontal collision of the vehicle will be described with reference to FIG. 8. As mentioned above, the OBC unit 1 is attached to the cross members 3 and 4 so as to be suspended by the L-shaped brackets 2 (2f and 2r). During the frontal collision of the vehicle, the front end of the vehicle collapses and moves rearward relative to the vehicle body. In association with this, the cross member, which is the radiator core upper support, is pushed toward the OBC unit 1.

Figure 8:
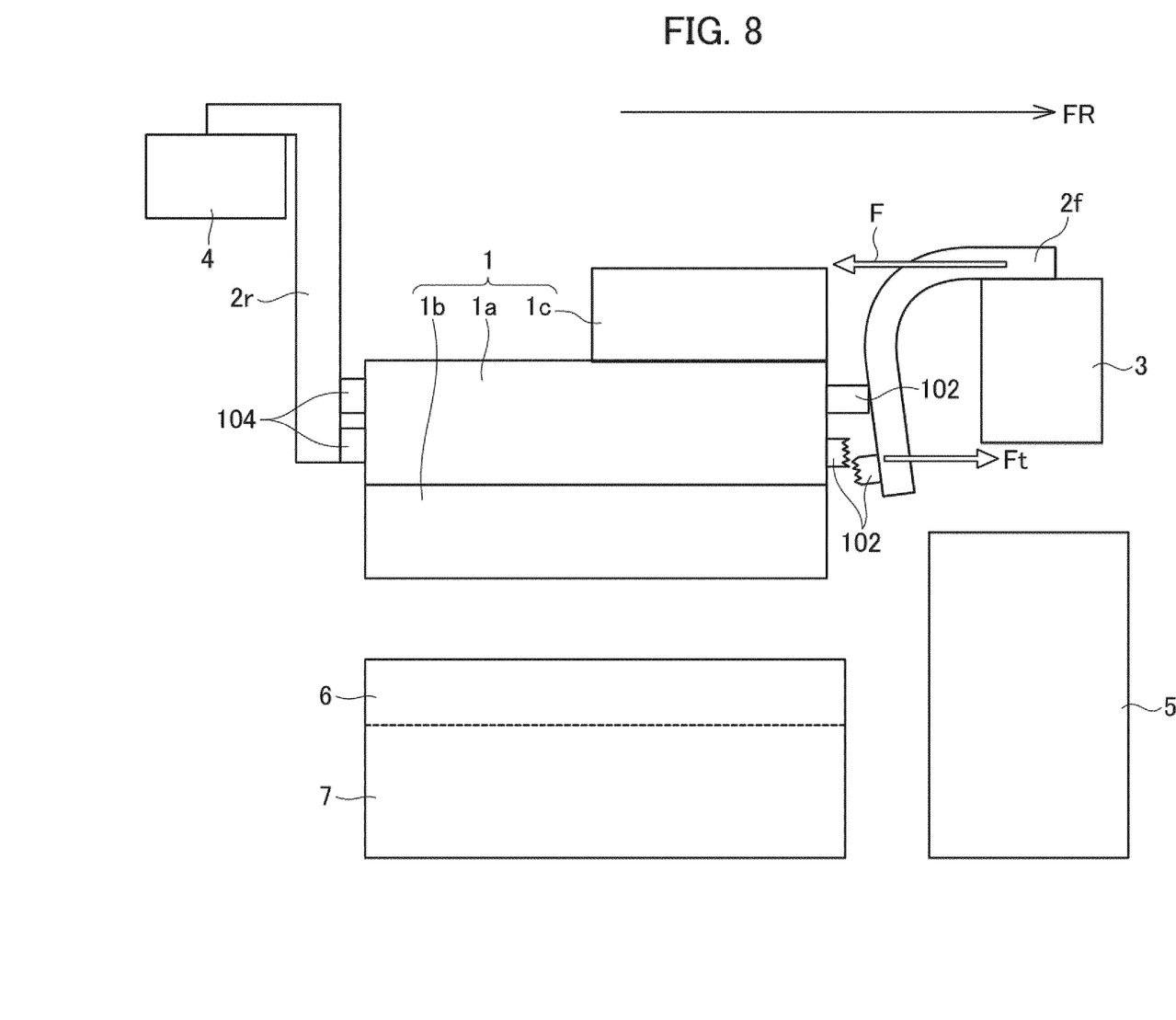
FIG. 8 is a schematic side view showing the installation structure at the event of a frontal collision of the vehicle.

At that moment, as indicated by an arrow F in FIG. 8, an impact load F moves the upper horizontal portion of the front bracket 2f relatively rearward via the cross member 3. As a result, a compressive force acts on the upper boss 102 and, as indicated by an arrow Ft in FIG. 8, a tensile force Ft acts on the lower boss 102 to pull out the bolt 202 by the principle of leverage. The tensile force Ft acting on the lower boss 102 causes the boss 102 to break at the vulnerable portion, i.e., at its root. Due to the break of the boss 102, the main body of the housing 100, i.e., the front plate 101, can be prevented from being damaged. As a result, the electrical components within the housing 100 are not exposed.

Figure 7:
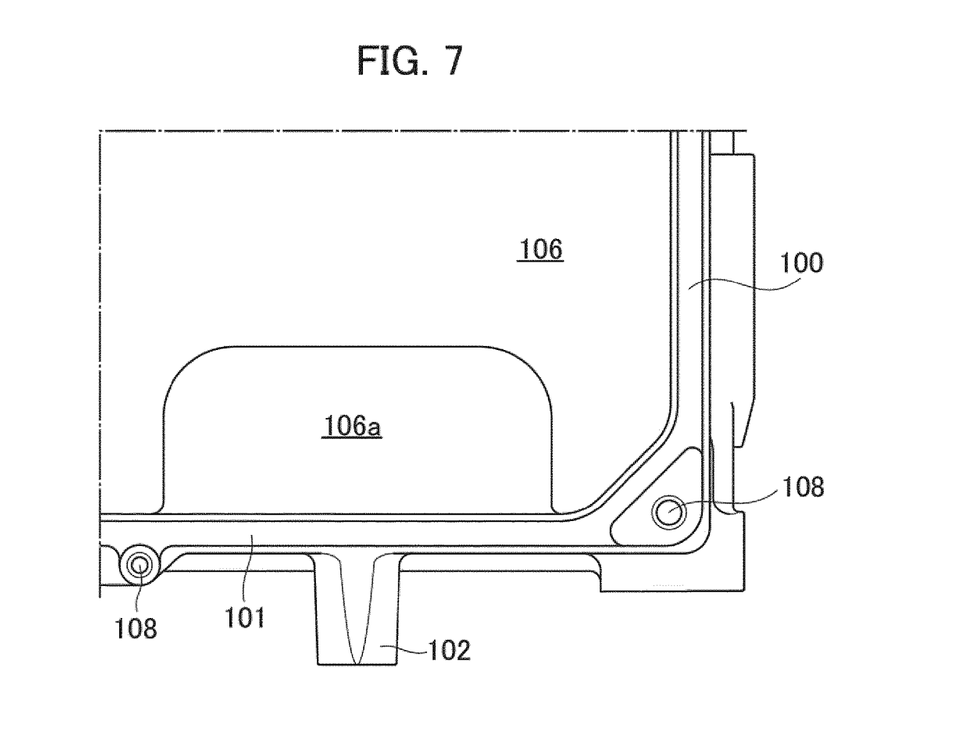
FIG. 7 is a partial plan view of the housing.

Here in the present embodiment, furthermore, as shown in FIGS. 5 to 7, the thickness of the bottom plate 106 on the opposite side to the boss 102 with respect to the front plate 101 is locally made large to form a thick portion 106a. That is, the thickness of the thick portion 106a is larger than the thickness of the other portions of the bottom plate 106 than the thick portion 106a. Not only is the front plate 101 reinforced by the pedestal 109, but the bottom plate 106 is also locally reinforced by the thick portion 106a, and thereby the main body of the housing 100 can more effectively resist the above-mentioned tensile force Ft. As a result, the damage to the main body of the housing 100, for example, separation of the front plate 101 from the bottom plate 106, can be prevented.

As explained above, the above-described installation structure is symmetrically constructed on the rear side of the OBC unit 1. If the impact load F is large and the OBC unit 1 is moved rearward relative to the vehicle body from the state shown in FIG. 8, the tensile force acts on the lower boss 104 on the rear side of the housing 100. Therefore, the vulnerable portion of the lower boss 104 breaks and the main body of the housing 100, i.e., the rear plate 103, can be prevented from being damaged. As a result, the electrical components within the housing 100 are not exposed.

As explained above, the installation structure of the present embodiment has the boss 102 protruding forward from the front plate 101 of the housing 100 of the high-voltage electrical device 1, the cross member 3 extending in the lateral direction in front of the high-voltage electrical device 1, and the L-shaped front bracket 2f. The lower vertical portion of the front bracket 2f is fastened to the bolt hole 102a of the boss 102 by the bolt 202, and its upper horizontal portion is fixed to the cross member 3. And, the vulnerable portion is formed at the root of the (lower) boss 102. Therefore, the vulnerable portion formed at the root of the boss 102 breaks in the event of a vehicle frontal collision, and thereby the main body of the housing 100 can be prevented from being damaged and the high-voltage strong electrical device 1 can be protected reliably.

With respect to the above-mentioned vulnerable portion, the boss 102 protrudes forward from the pedestal 109 formed on the front plate 101. In addition, the thickness t1 of the root of the boss 102 in the direction perpendicular to the axial line O of the bolt hole 102a is made smaller than the thickness t2 of the pedestal 109 in that direction. Therefore, the boss 102 can be securely broken at the vulnerable portion at the root of the boss 102.

In addition, with respect to the above-mentioned vulnerable portion, the rising curvature radius R1 of the root of the boss 102 from the pedestal 109 is made smaller than the curvature radius R2 of the pedestal 109 from the front plate 101. Thus, the boss 102 can be more reliably broken at the vulnerable portion at the root of the boss 102.

Furthermore, the thickness of the bottom plate 106 on the opposite side to the boss 102 with respect to the front plate 101 is made locally large to form the thick portion 106a. Thus, the housing 100 can be more reliably prevented from being damaged.

Note that the invention is not limited to the above embodiment. For example, the bosses 102 (104) are provided as a pair, two of which are aligned vertically, in the above embodiment. However, only one boss 102 may be provided at a positon of each pair of them. Also in this case, the tensile force acts on the boss 102 (104) due to the L-shaped front bracket 2f (rear bracket 2r), and the housing 100 can be prevented from being damaged.

REFERENCE SIGNS LIST

1 OBC unit (high-voltage electrical device)
1a OBC (high-voltage electrical device)
2 bracket
2f front bracket
2r rear bracket
3,4 cross member
100 housing (of the high-voltage electrical device 1, 1a)
101 front plate
102 boss
102a bolt hole
106 bottom plate
106a thick portion
109 pedestal
O axial line (of the bolt hole 102a)
t1 thickness (of the boss 102)
t2 thickness (of the pedestal 109)
R1 rising curvature radius (of the boss 102)
R2 rising curvature radius (of the pedestal 109)

The invention claimed is:

1. An installation structure of a high-voltage electrical device installed on a front section of a vehicle, the structure comprising:
    the high-voltage electrical device;
    a boss that is integrally formed with and protrudes forward from a pedestal formed on a front panel of a housing of the high-voltage electrical device, a bolt hole being formed at the center of the boss;
    a cross member that extends in a lateral direction of the vehicle in front of the high-voltage electrical device to construct a vehicle body of the vehicle; and
    an L-shaped front bracket whose lower vertical portion is fastened to the boss by a bolt and whose upper horizontal portion is fixed to the cross member,
    wherein a vulnerable portion is formed at a root of the boss where the boss connects to the pedestal.

2. The installation structure according to claim 1, wherein a thickness of a bottom plate of the housing on an opposite side to the boss with respect to the front panel is made locally large.

3. The installation structure according to claim 1, wherein the bolt hole is a non-through bolt hole formed at a front face of the boss, and
    the lower vertical portion of the L-shaped front bracket is fastened to the front face of the boss by a bolt screwed into the non-through bolt hole.

4. An installation structure, of a high-voltage electrical device installed on a front section of a vehicle, the structure comprising:
    the high-voltage electrical device;
    a boss that protrudes forward from a front panel of a housing of the high-voltage electrical device, a bolt hole being formed at the center of the boss;
    a cross member that extends in a lateral direction of the vehicle in front of the high-voltage electrical device to construct a vehicle body of the vehicle; and
    an L-shaped front bracket whose lower vertical portion is fastened to the boss by a bolt and whose upper horizontal portion is fixed to the cross member,
    wherein a vulnerable portion is formed at a root of the boss,
    wherein the boss protrudes forward from a pedestal formed on the front panel, and wherein a thickness of the vulnerable portion in a direction perpendicular to an axial line of the bolt hole is made smaller than a thickness of the pedestal in the direction.

5. The installation structure according to claim 4, wherein a rising curvature radius of the root, as the vulnerable portion, from the pedestal is made smaller than a rising curvature radius of the pedestal from the front panel.

\* \* \* \* \*